G. C. WELTER.
FLY CATCHER AND GARBAGE CAN COMBINATION.
APPLICATION FILED JUNE 24, 1912.
1,082,103.
Patented Dec. 23, 1913.
2 SHEETS—SHEET 2.
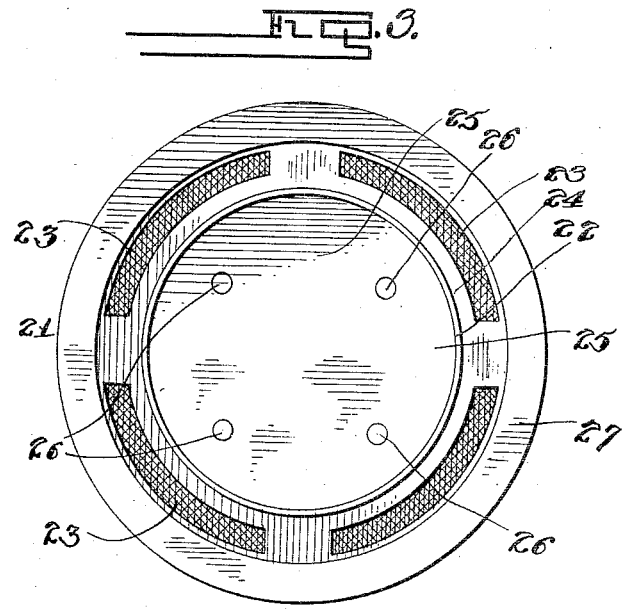
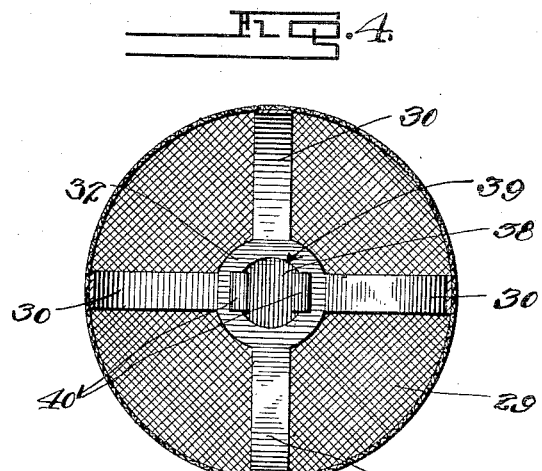
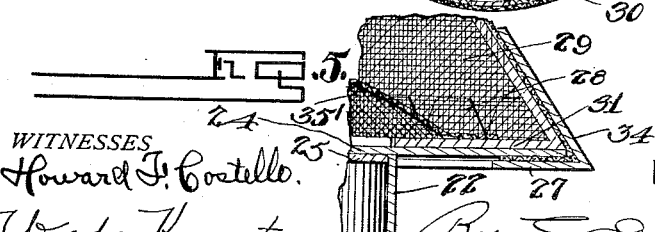

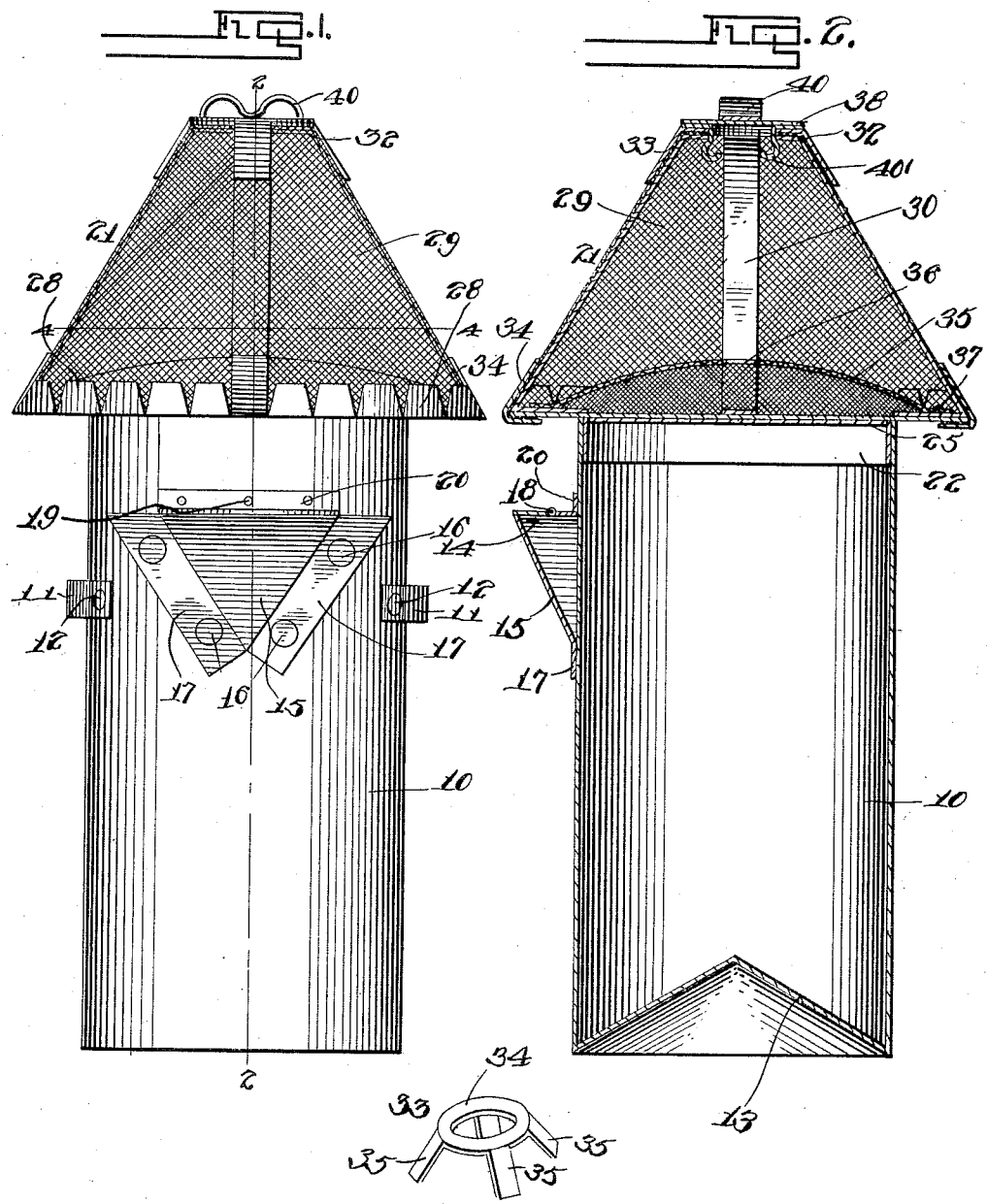

UNITED STATES PATENT OFFICE.

GROVER C. WELTER, OF ROSWELL, NEW MEXICO.

FLY-CATCHER AND GARBAGE-CAN COMBINATION.

1,082,103.

Specification of Letters Patent.  Patented Dec. 23, 1913.

Application filed June 24, 1912.  Serial No. 705,543.

*To all whom it may concern:*

Be it known that I, GROVER C. WELTER, citizen of the United States, residing at Roswell, in the county of Chaves and State of New Mexico, have invented certain new and useful Improvements in a Fly-Catcher and Garbage-Can Combination, of which the following is a specification, reference being had therein to the accompanying drawing.

This invention relates to fly traps and it is especially designed to be placed on the top of a garbage receptacle.

An object of this invention is the production of a fly trap which can be detached from the garbage receptacle and empty the flies out.

Another object of this invention is to provide a device that readily admits the flies, but prevents their exit.

With these and other objects in view this invention consists in certain novel combinations, constructions, and arrangement of parts as will be hereinafter fully described and claimed.

In the accompanying drawings:—Figure 1 is a side elevation of the improved device. Fig. 2 is a vertical section taken on line 2—2, of Fig. 1. Fig. 3 is a bottom plan view of the fly retaining receptacle. Fig. 4 is a section taken on line 4—4, of Fig. 1. Fig. 5 is an enlarged detail sectional view of the wire holding means of the fly retaining receptacle. Fig. 6 is a perspective view of the reinforcing lid which fits on the apex of the fly retaining receptacle.

Referring to the parts by numerals the supporting receptacle 10 is provided with the handle 11 fixedly secured on its side by the rivets 12. This supporting receptacle 10 is provided with the conical shape bottom 13 which enables only the edge of the can to touch the ground, thus preventing rusting or like destruction, which happens when the whole bottom of the garbage or like receptacle rests flat on the ground. A garbage admitting opening 14 is provided in the receptacle 10 and has a flared outward V-shaped guide 15 fixedly held by the rivets 16 through the flanges 17 on the outside of the can. This V-shape guide is provided with a hinged top 18 which is permanently secured to the can by the rivets 19 passing through the upturned flange 20.

The conical fly retaining receptacle 21 is carried by the supporting receptacle 10 and the downwardly extending flange 22 is carried by the conical fly retaining receptacle 21 to hold the receptacle 21 in position. This downwardly extending flange fits in the top of the supporting receptacle 10 thereby holding the fly retaining receptacle from movement.

Arc shaped fly admitting openings 23 are formed in the bottom 24. This bottom 24 also acts as a rest for the fly retaining receptacle as the downwardly extending retaining flange is positioned so that the small portions of the bottom 24 project from the downwardly extending flange thereby resting on the top of the supporting receptacle. A reinforcing disk 25 is held on the under side of the bottom 24 by the rivets 26. This reinforcing disk 25 acts as a support for the downwardly extending flange 22.

A metallic ring 27 is carried by the edge of the bottom 24 and is provided with upturned flanges 28. This ring and the upturned flanges 28 form the securing means for the wire 29 at the base of the conical shape fly retaining receptacle. Converging wire supporting members 30 are held to the bottom 27 by the inwardly bent flange 31. These converging wire supporting members 30 terminate in a ring 32 at the apex of the fly retaining receptacle. A reinforcing lid 33 is mounted on the outside of the wire at the apex of the fly retaining device. The reinforcing members consist of a ring or body portion 34 and outwardly extending portions 35. The body portion or ring 34 is mounted upon the ring 32 and the downwardly extending portions 35 follow the wire supporting members 30 for a short distance and are soldered to the wire by this construction and the apex is formed very substantially. Following the wire supporting members for a short distance from the bottom of the fly retaining receptacle are the long upwardly curved flanges 34 which are soldered to the wire.

Mounted on the bottom is a wire dome 35′ which is provided with an opening 36 at its apex. This wire dome is fixedly secured to the bottom by the rivets 37. A lid 38 is adapted to close the opening 39 at the apex of the fly retaining receptacle. This lid is provided with a handle 40 and downwardly projecting resilient spring members 40' adapted to engage the sides of the aperture 39.

The operation of this device is as follows: The flies are attracted by the contents of the supporting receptacle 10 and finding no other entrance will enter the arc shaped apertures 23 of the fly retaining receptacle which lie in alinement with the side of the receptacle 10, they will then be within the dome 35' but will quickly enter the large portion of the fly retaining receptacle by leaving through the opening 36. On once entering the trap the flies cannot get out. When it is desired to remove the flies from the fly retaining receptacle the fly retaining receptacle can be taken from the top of the supporting receptacle 10, and the head or lid 40 can then be withdrawn from the apex of the fly retaining receptacle and the flies emptied out.

Having thus described the invention what is claimed as new, is:—

A fly catcher of the class described comprising a support, a body positioned upon said support and comprising a base, said base provided with a plurality of converging arms, an integral connecting means engaging the upper end of said arms, a band passing around the lower edge of said body, said band provided with a plurality of upwardly extending wire retaining lugs, a wire mesh covering positioned over said upwardly extending converging arms, said upwardly extending lugs firmly holding said wire mesh covering upon said body, a protector ring positioned upon the upper end of said body and provided with a plurality of downwardly extending diverging arms which fit snugly against said upwardly extending converging arms for firmly holding said wire mesh covering upon said upwardly extending diverging arms throughout their entire length fitting in close proximity with said upwardly extending arms, and a plurality of clamping fingers carried by said retaining ring and fitting snugly against said upwardly extending converging arms for keeping said wire mesh in a taut position upon said body.

In testimony whereof I hereunto affix my signature in presence of two witnesses.

GROVER C. WELTER.

Witnesses:
W. G. WELTER,
S. P. JOHNSON.

Copies of this patent may be obtained for five cents each, by addressing the "Commissioner of Patents, Washington, D. C."